United States Patent
Havinis et al.

(10) Patent No.: US 6,463,289 B1
(45) Date of Patent: Oct. 8, 2002

(54) SYSTEM AND METHOD FOR PROVIDING RESTRICTING POSITIONING OF A TARGET MOBILE STATION BASED ON THE CALCULATED LOCATION ESTIMATE

(75) Inventors: Theodore Havinis, Richardson; David Boltz, Garland, both of TX (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/370,944

(22) Filed: Aug. 9, 1999

(51) Int. Cl.[7] .................................................. H04Q 7/20
(52) U.S. Cl. ....................... 455/456; 455/411; 455/421
(58) Field of Search ......................... 342/457; 455/456, 455/422, 428, 433–435, 457, 461, 421, 560, 561, 466; 340/989, 434

(56) References Cited

U.S. PATENT DOCUMENTS

| | | | | |
|---|---|---|---|---|
| 5,442,805 A | * | 8/1995 | Sagers et al. ............... | 455/456 |
| 5,682,142 A | * | 10/1997 | Loosmore et al. .......... | 340/572 |
| 5,727,057 A | * | 3/1998 | Emery et al. ............... | 379/211 |
| 5,768,686 A | * | 6/1998 | LeBlanc et al. ............ | 455/456 |
| 5,940,764 A | * | 8/1999 | Mikami ....................... | 455/456 |
| 5,950,125 A | * | 9/1999 | Buhrmann et al. ......... | 455/422 |
| 5,960,341 A | * | 9/1999 | LeBlanc et al. ............ | 455/426 |
| 6,011,973 A | * | 1/2000 | Valentine et al. ........... | 455/456 |
| 6,023,624 A | * | 2/2000 | Hanson ....................... | 455/458 |
| 6,101,387 A | * | 8/2000 | Granberg et al. ........... | 455/433 |
| 6,104,931 A | * | 8/2000 | Havinis et al. ............. | 455/456 |
| 6,134,447 A | * | 10/2000 | Havinis et al. ............. | 455/456 |
| 6,138,003 A | * | 10/2000 | Kingdon et al. ............ | 455/410 |
| 6,167,266 A | * | 12/2000 | Havinis et al. ............. | 455/433 |
| 6,181,934 B1 | * | 1/2001 | Havinis et al. ............. | 455/432 |
| 6,195,557 B1 | * | 2/2001 | Havinis et al. ............. | 455/456 |
| 6,212,390 B1 | * | 4/2001 | Rune .......................... | 455/456 |
| 6,249,808 B1 | * | 6/2001 | Seshadri ..................... | 709/206 |
| 6,256,064 B1 | * | 6/2001 | Monroe ........................ | 455/66 |
| 6,272,342 B1 | * | 8/2001 | Havinis et al. ............. | 455/433 |
| 6,295,454 B1 | * | 9/2001 | Havinis et al. ............. | 455/456 |
| 6,347,228 B1 | * | 2/2002 | Ludden et al. ............. | 455/456 |

* cited by examiner

*Primary Examiner*—Edward F. Urban
*Assistant Examiner*—Charles Craver
(74) *Attorney, Agent, or Firm*—Jenkens & Gilchrist, P.C.

(57) ABSTRACT

A telecommunications system and method is disclosed for defining restricted positioning areas by geographical location. The restricted area information can be established by the cellular network or the mobile subscriber, and can be stored in a database, such as an Intelligent Network (IN) node. An IN trigger can be included in the subscriber information provided to the serving Mobile Switching Center/Visitor Location Register (MSC/VLR) or the IN trigger can be stored in specific MSC/VLR's that have restricted positioning areas for all mobile subscribers. Upon receiving the calculated location estimate, the IN trigger is activated, and the MSC/VLR transmits the calculated location estimate to the IN node to determine whether the calculated location estimate can be provided to the requesting Location Services (LCS) client based upon the defined restricted positioning area information.

30 Claims, 5 Drawing Sheets

SYSTEM AND METHOD FOR PROVIDING RESTRICTING POSITIONING OF A TARGET MOBILE STATION BASED ON THE CALCULATED LOCATION ESTIMATE

BACKGROUND OF THE PRESENT INVENTION

Field of the Invention

The present invention relates generally to telecommunications systems and methods for positioning a target mobile station within a cellular network, and specifically to providing position related services based on the calculated location of the target mobile station.

BACKGROUND AND OBJECTS OF THE PRESENT INVENTION

Determining the geographical position of an mobile subscriber within a cellular network has recently become important for a wide range of applications. For example, location services (LCS) may be used by transport and taxi companies to determine the location of their vehicles. In addition, for emergency calls, e.g., 911 calls, the exact location of the mobile subscriber may be extremely important to the outcome of the emergency situation. Furthermore, LCS can be used to determine the location of a stolen car, for the detection of home zone calls, which are charged at a lower rate, for the detection of hot spots for micro cells, or for the subscriber to determine, for example, the nearest gas station, restaurant, or hospital, e.g., "Where am I" service.

In some instances, the mobile subscriber or the cellular network currently serving the mobile subscriber may not want to provide the location information to the requesting LCS client. For example, the mobile subscriber may not want his or her location to be provided when that subscriber is at home, at work or at a location that the mobile subscriber would like to restrict positioning. Likewise, the network may not want to provide location information when the mobile subscriber is in an area that requires secrecy, such as a military base, government office, police station or other area that the network would like to restrict positioning.

Currently, to prevent an LCS client from obtaining location information, a mobile subscriber can define a Subscriber Location Privacy Profile (SLPP), which indicates which LCS clients are allowed to position the mobile subscriber and in which locations those LCS clients are allowed to position the mobile subscriber. However, the allowed or disallowed location (s) can only be defined by network area, such as by cell or Location Area (LA), all of which typically cover a large geographical region. This is due to the fact that the SLPP is only used in an initial determination of whether or not the LCS client is allowed to position the mobile subscriber. This determination is typically performed before the geographical location information is calculated, which requires the determination to be made based upon the network area that the mobile subscriber is currently located in.

If the restricted area covers only a portion of a network area, such as a cell, defining an entire network area as a disallowed area unnecessarily prevents an LCS client from obtaining location information. In addition, if the network determines that a portion of a network area should be restricted from positioning, the network must prevent all positioning from being performed in the entire network area. This is undesirable for both the network and the mobile subscriber.

SUMMARY OF THE INVENTION

The present invention is directed to telecommunications systems and methods for defining restricted positioning areas by geographical location. The restricted area information can be established by the cellular network or the mobile subscriber, and can be stored in a database, such as an Intelligent Network (IN) node. An IN trigger can be included in the subscriber information provided to the serving Mobile Switching Center/Visitor Location Register (MSC/VLR) or the IN trigger can be stored in specific MSC/VLR's that have restricted positioning areas for all mobile subscribers. Upon receiving the calculated location estimate, the IN trigger is activated, and the MSC/VLR transmits the calculated location estimate to the IN node to determine whether the calculated location estimate can be provided to the requesting LCS client based upon the defined restricted area information.

BRIEF DESCRIPTION OF THE DRAWINGS

The disclosed invention will be described with reference to the accompanying drawings, which show important sample embodiments of the invention and which are incorporated in the specification. hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
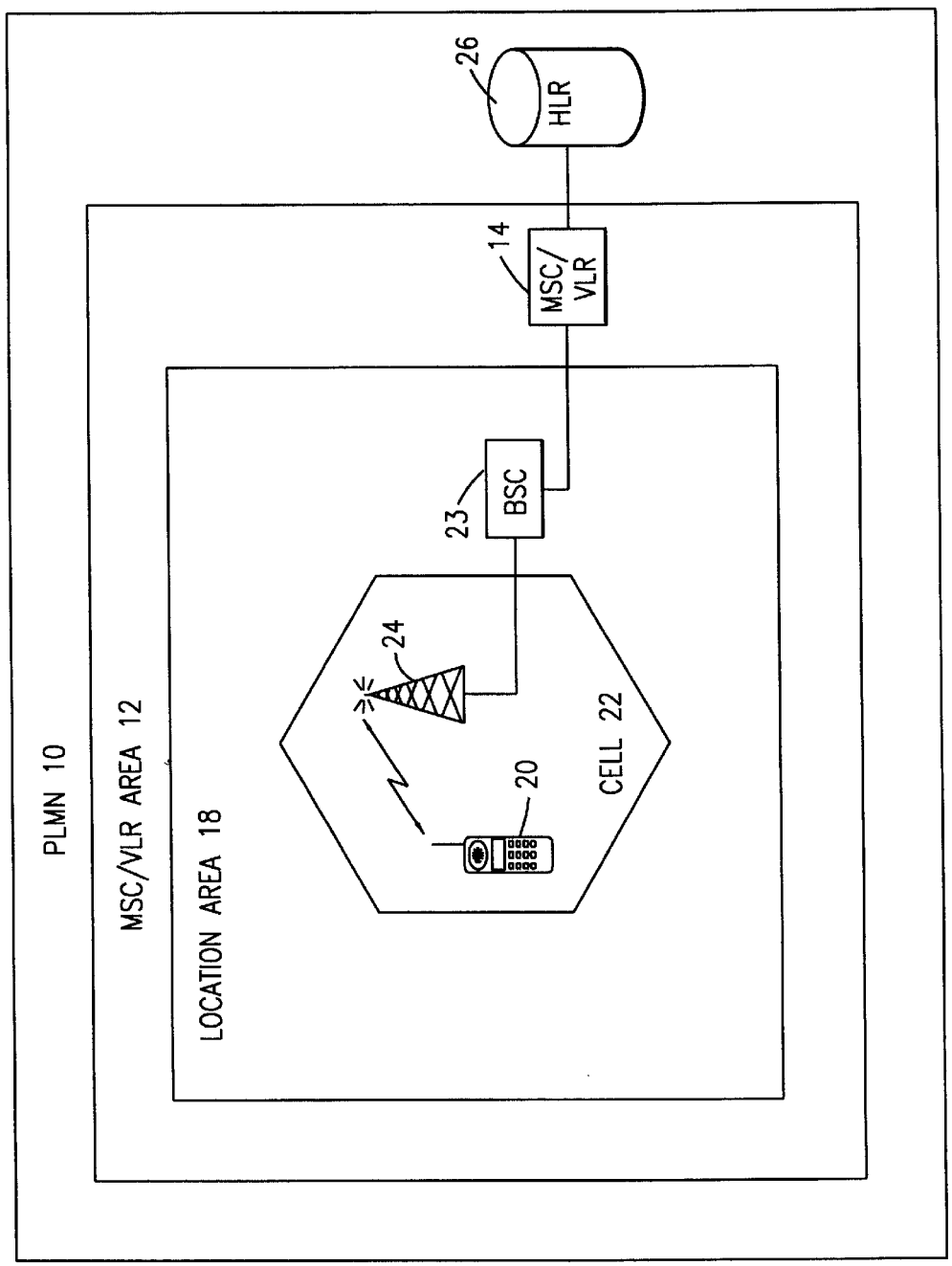
FIG. 1 is a block diagram of a conventional cellular network.

With reference now to FIG. 1 of the drawings, there is illustrated a sample cellular network 10, such as a Global System for Mobile Communications (GSM) Public Land Mobile Network (PLMN), which in turn is composed of a plurality of areas 12, each with a Mobile Switching Center (MSC) and an integrated Visitor Location Register (VLR) (MSC/VLR) 14 therein. The MSC/VLR 14 provides a circuit switched connection of speech and signaling information between a Mobile Station (MS) 20 and the PLMN 10. The MSC/VLR areas 12, in turn, include a plurality of Location Areas (LA) 18, which are defined as that part of a given MSC/VLR area 12 in which the MS 20 may move freely without having to send update location information to the MSC/VLR 14 that.controls the LA 18. Each LA 18 is divided into a number of cells 22. The MS 20 is the physical equipment, e.g., a car phone or other portable phone, used by mobile subscribers to communicate with the cellular network 10, each other, and users outside the subscribed network, both wireline and wireless.

The MSC/VLR 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the cell 22 for which it is responsible. It should be understood that the BSC 23 may be connected to several BTS's 24, and may be implemented as a stand-alone node or integrated with the MSC/VLR 14.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information, for subscribers registered within that PLMN 10. The HLR 26 may be co-located with a given MSC/VLR 14, integrated with the MSC/VLR 14, or alternatively can service multiple MSC/VLRs 14.

Figure 2:
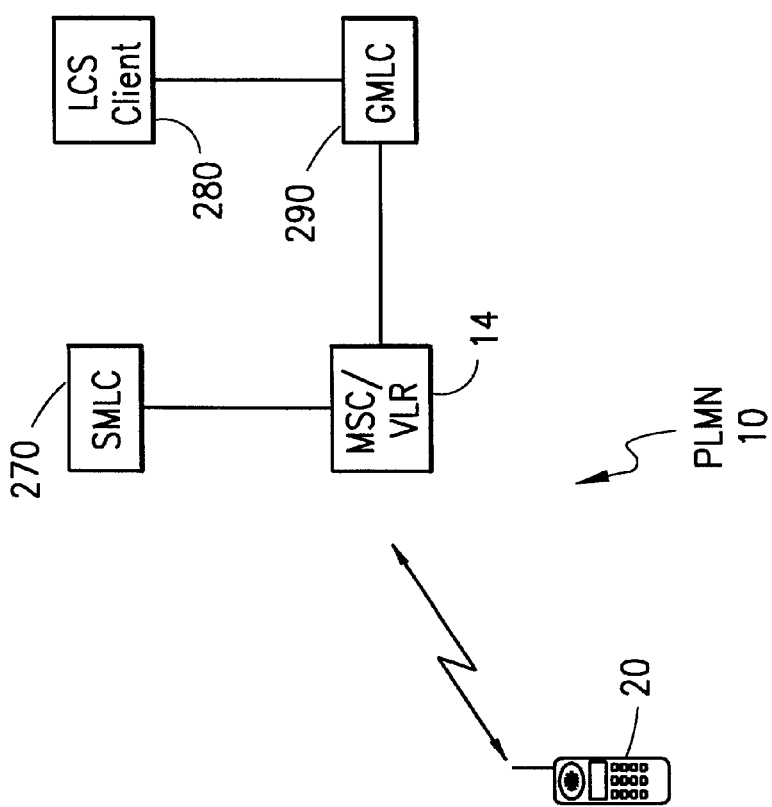
FIG. 2 is a block.diagram illustrating a cellular network performing a conventional positioning of a mobile subscriber.

As can be seen in FIG. 2 of the drawings, for conventional positioning of a particular MS 20, upon the reception of a positioning request from a Location Services (LCS) client 280, the MSC/VLR 14 sends a Mobile Application Part (MAP) PERFORM LOCATION message to a Serving Mobile Location Center (SMLC) 270 within the PLMN 10 associated with the MSC/VLR 14. The SMLC 270 is responsible for carrying out the positioning request and calculating the MS 20 location. Thereafter, the SMLC 270 determines the positioning method to use. For example, the SMLC 270 can use a number of different positioning mechanisms, including, but not limited to, Timing Advance (TA), Time of Arrival (TOA), Enhanced Observed Time Difference (E-OTD) or Global Positioning System (GPS).

After the SMLC 270 determines the positioning method to use, the SMLC 270 instructs the MSC/VLR 14 to obtain raw location data using the determined positioning method and return this raw location data to the SMLC 270. Thereafter, the SMLC 270 calculates the MS 20 location and returns this location estimate to the MSC/VLR 14. In turn, the MSC/VLR 14 forwards the location estimate to the LCS client 280 that requested the positioning. It should be noted that the requesting LCS client 280 could be located within the MS 20 itself, within the MSC/VLR 14 or could be an external node, such as an Intelligent Network (IN) node. If the LCS client 280 is not within the MS 20 or within the MSC/VLR 14, the location estimate is sent to the requesting LCS client 280 via the MSC/VLR 14 and a Gateway Mobile Location Center (GMLC) 290.

Figure 3:
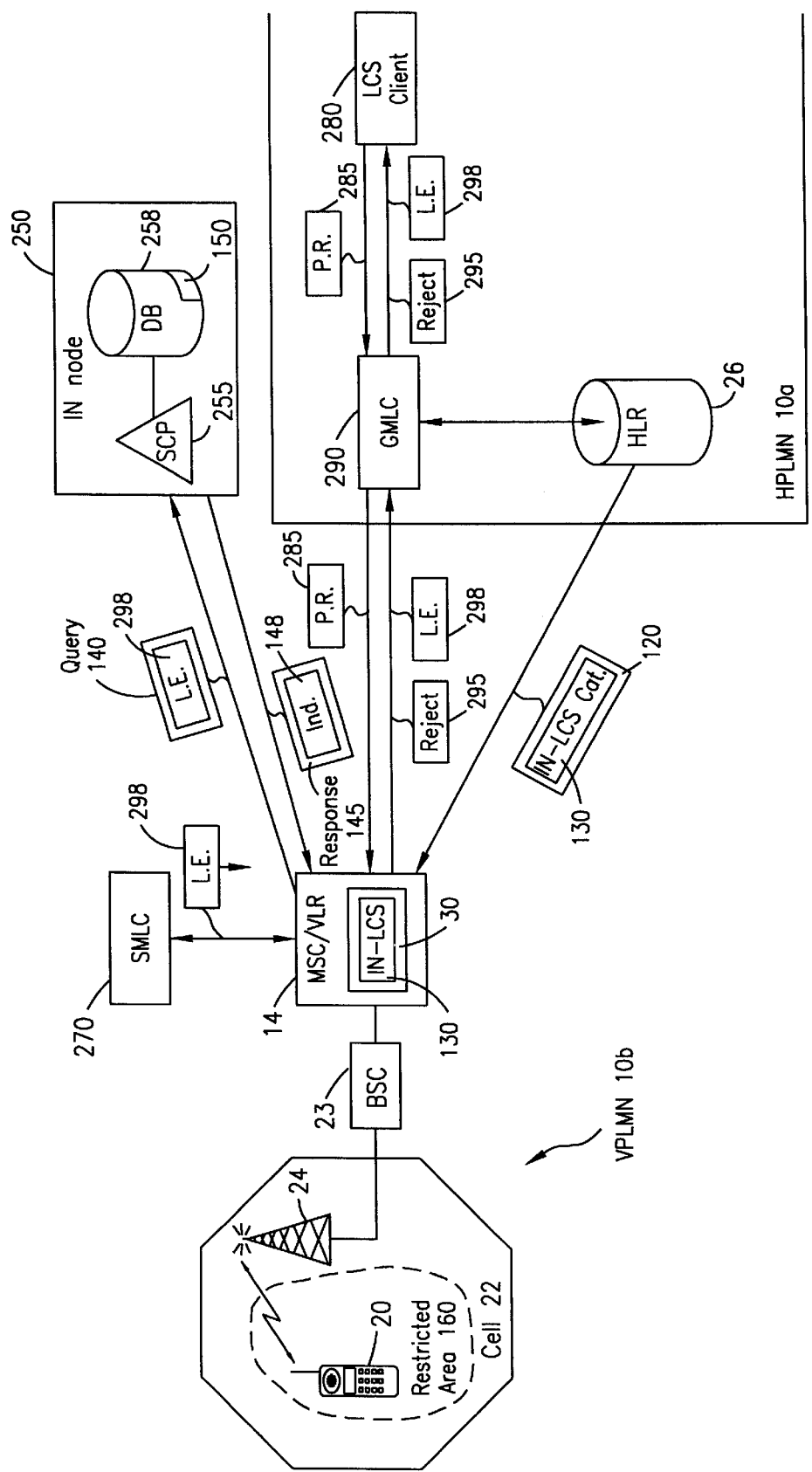
FIG. 3 is an exemplary block diagram illustrating a cellular network providing positioning information associated with a mobile subscriber based upon restricted geographical information, in accordance with embodiments of the present invention.

With reference now to FIG. 3 of the drawings, in order to restrict the positioning of a mobile subscriber within a specific geographical area 160, restricted area information 150 associated with the geographical area 160 can be defined by either the network operator or the mobile subscriber. If the restricted area information 150 is defined by the network operator, the restricted area information 150 can be valid for any mobile subscriber being positioned within the restricted geographical area 160. In addition, this restricted area information 150 can be stored in the MSC/VLR 14 serving the restricted area 160 or within an external node, such as an IN node 250, the latter being illustrated.

However, if the restricted area information 150 is defined by the mobile subscriber, this restricted area information 150 only applies to that mobile subscriber. In this case, the restricted area information 150 can be stored in the HLR 26 associated with the mobile subscriber or within the IN node 250, the latter being illustrated. The restricted area information 150 could be, for example, a set of coordinates, a set of coordinates along with a defined radius around that set of coordinates or at least three sets of coordinates that define the geographical area 160 encompassed by the restricted area information 150.

When an MS 20 first registers with a serving MSC/VLR 14, which could be in the home PLMN 10*a* or within a visiting PLMN 10*b*, the latter being illustrated, the MS 20 sends a location updating message to the MSC/VLR 14. In response, the MSC/VLR 14 sends an update location message to the HLR 26, which returns subscriber information associated with the MS 20 back to the MSC/VLR 14 in an Insert Subscriber Data message 120.

If the mobile subscriber has defined at least one restricted geographical area 160, the restricted area information 150 can be passed back to the MSC/VLR 14 in the Insert Subscriber Data message 120 and stored in a subscriber record or database 30 associated with the MS 20 within the MSC/VLR 14. Alternatively, and preferably, instead of sending the restricted area information 150 directly to the MSC/VLR 14, the HLR 26 can send a new subscriber IN-LCS category 130 in the Insert Subscriber Data message 120. The IN-LCS category 130 serves as an IN trigger to the IN node 250 housing the restricted area information 150. It should be understood that if the PLMN 10*b* defined the restricted area information, the IN-LCS category 130 would be provided to the MSC/VLR 14 by the PLMN 10*b* and stored in the database 30 in the MSC/VLR 14.

With reference now to the steps shown in FIG. 4 of the drawings, which will be described in connection with FIG. 3 of the drawings, once the MS 20 is registered with the MSC/VLR 14, an LCS client 280 can send a positioning request 285, which specifies the particular Mobile Station Integrated Services Digital Network (MSISDN) number associated with the particular target MS 20 to be positioned, to the GMLC 290 within the PLMN 10*a* of the LCS client 280 (step 400). It should be noted that the positioning request 285 can also include the duration and/or number of positionings to be performed.

When the GMLC 290 receives the positioning request 285, the GMLC 290 sends a request for routing information (step 405), e.g., the address of the serving MSC/VLR 14 within the PLMN 10*b* that the MS 20 is currently located in, to the HLR 26 associated with the MS 20, using the MS's 20 directory number as a global title. In response, the HLR 26 retrieves routing information for the MS 20 and sends this routing information to the GMLC 290 (step 410). Using this routing information, the GMLC 290 transmits a MAP_PROVIDE_SUBSCRIBER_LOCATION message, which contains the positioning request 285, to the serving MSC/VLR 14 (step 415).

Thereafter, the MSC/VLR 14 verifies that the MS 20 allows positioning to be performed (step 420), e.g., by checking privacy information, such as the Subscriber Location Privacy Profile (SLPP), which is also sent to the MSC/VLR 14 by the HLR 26 in the Insert Subscriber Data message 120. If the MS 20 does not allow positioning (step 420), the positioning request 285 is rejected (step 425) and a rejection message 295 is sent to the LCS client 280 (step 430).

However, if the MS 20 does allow positioning (step 420), and the MS 20 is in idle mode (step 435), the MSC/VLR 14 performs paging and authentication of the MS 20, along with ciphering of the positioning data (step 440). This procedure provides the MSC/VLR 14 with the identification (ID) of the current cell 22 that the MS 20 is located in, along with a Timing Advance (TA) value for the serving BTS 24 (step 445). However, if the.MS 20 is in dedicated mode (step 435), e.g., involved in a call connection, the MSC/VLR 14 obtains the current cell 22 ID and TA value for the serving BTS 24 from the serving BSC 23 (step 445).

Upon receipt of the current cell 22 ID and TA value (step 445), the MSC/VLR 14 sends a MAP_PERFORM_LOCATION message, which includes the current cell 22 ID and TA value, to the SMLC 270 associated with the MS's 20 current cell 22 ID (step 450). Thereafter, the SMLC 270 determines the positioning method to use, e.g., Timing Advance (TA), Time of Arrival (TOA), Enhanced Observed Time Difference (E-OTD) or Global Positioning System (GPS) (step 455).

Once the SMLC 270 determines the appropriate positioning method, the SMLC 270 sends to the MSC/VLR 14 the chosen positioning method and any assistance data that the MS 20 might need if the MS 20 has the capability to position itself (step 460). Thereafter, if the chosen positioning method does not involve the MS 20 positioning itself (step 465), as is shown in FIG. 3, the MSC/VLR 14 obtains raw location data, such as TA values from neighboring BTSs (not shown), and forwards this raw location data to the SMLC 270 (step 470) for calculation of the geographical location estimate 298, e.g., X, Y coordinates, of the MS 20 (step 475). Otherwise, the MS 20 uses the assistance data provided by the SMLC 270 to calculate its own location 298 (step 480). This location estimate 298 is passed back to the MSC/VLR 14 (step 485), which normally forwards the location estimate 298 to the requesting LCS client 280 (step 495) via the GMLC 290.

Figure 5:
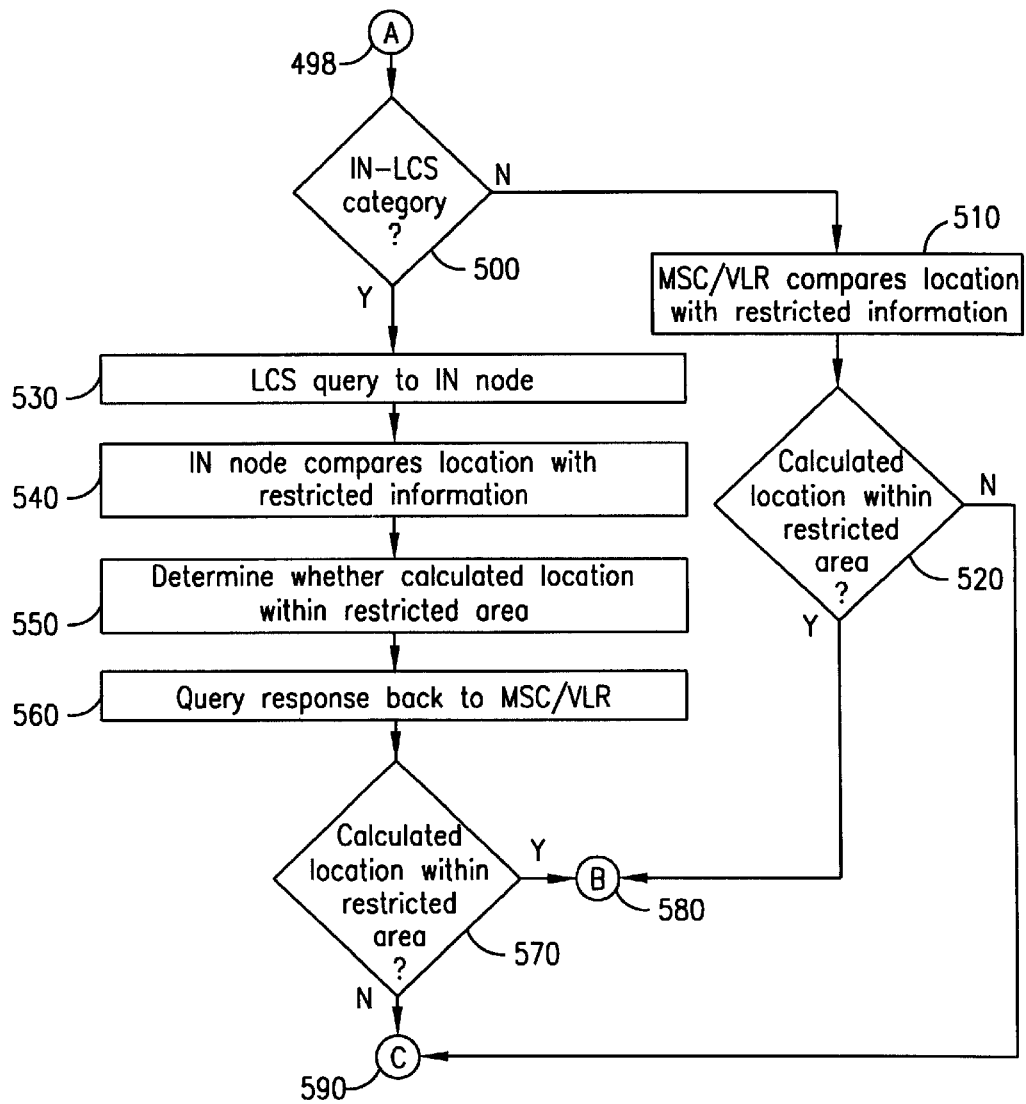
FIG. 5 is a flow chart illustrating the steps involved in determining whether the calculated location is within the restricted geographical area, in accordance with embodiments of the present invention.

However, if the MS 20 or visiting PLMN 10b has defined restricted area information 150 (step 490), upon receiving the location estimate 298, a determination is made of whether the calculated location estimate 298 is within the geographical area 160 encompassed by the restricted area information 150 (step 498). With reference now to the steps listed in FIG. 5 of the drawings, if the MS 20 or MSC/VLR 14 does not have the IN-LCS category 130 associated therewith (step 500), but rather the restricted area information 150 is stored in the MSC/VLR 14, the MSC/VLR 14 compares the calculated location estimate 298 with the restricted area information 150 (step 510) to determine if the calculated location estimate 298 is within the restricted geographical area 160 (step 520).

If the MS 20 or MSC/VLR 14 does have the IN-LCS category 130 associated therewith (step 500), the IN-LCS category 130 within the MSC/VLR 14 triggers the MSC/VLR 14 to send an LCS query 140 (step 530), including the location estimate 298, to the IN node 250 that stores the restricted area information 150 for the MS 20 or MSC/VLR 14. It should be understood that the IN node 250 could be, for example, a Service Control Point (SCP) 255 within the IN that has access to a database 258 that stores the restricted area information 150.

In response, the IN node 250 compares the calculated location estimate 298 with the restricted area information 150 (step 540) to. determine whether the calculated location estimate 298 is within the restricted positioning area 160 (step 550). After the determination is made, the IN node 250 sends a query response 145 back to the MSC/VLR 14 (step 560), including an indication 148 indicating whether or not the calculated location estimate 298 is within the restricted area 160. By removing the restricted area information 150 to the IN node 250, the comparison and determination processes do not need to be performed by the MSC/VLR 14, which reduces the burden on the MSC/VLR 14.

Figure 4:
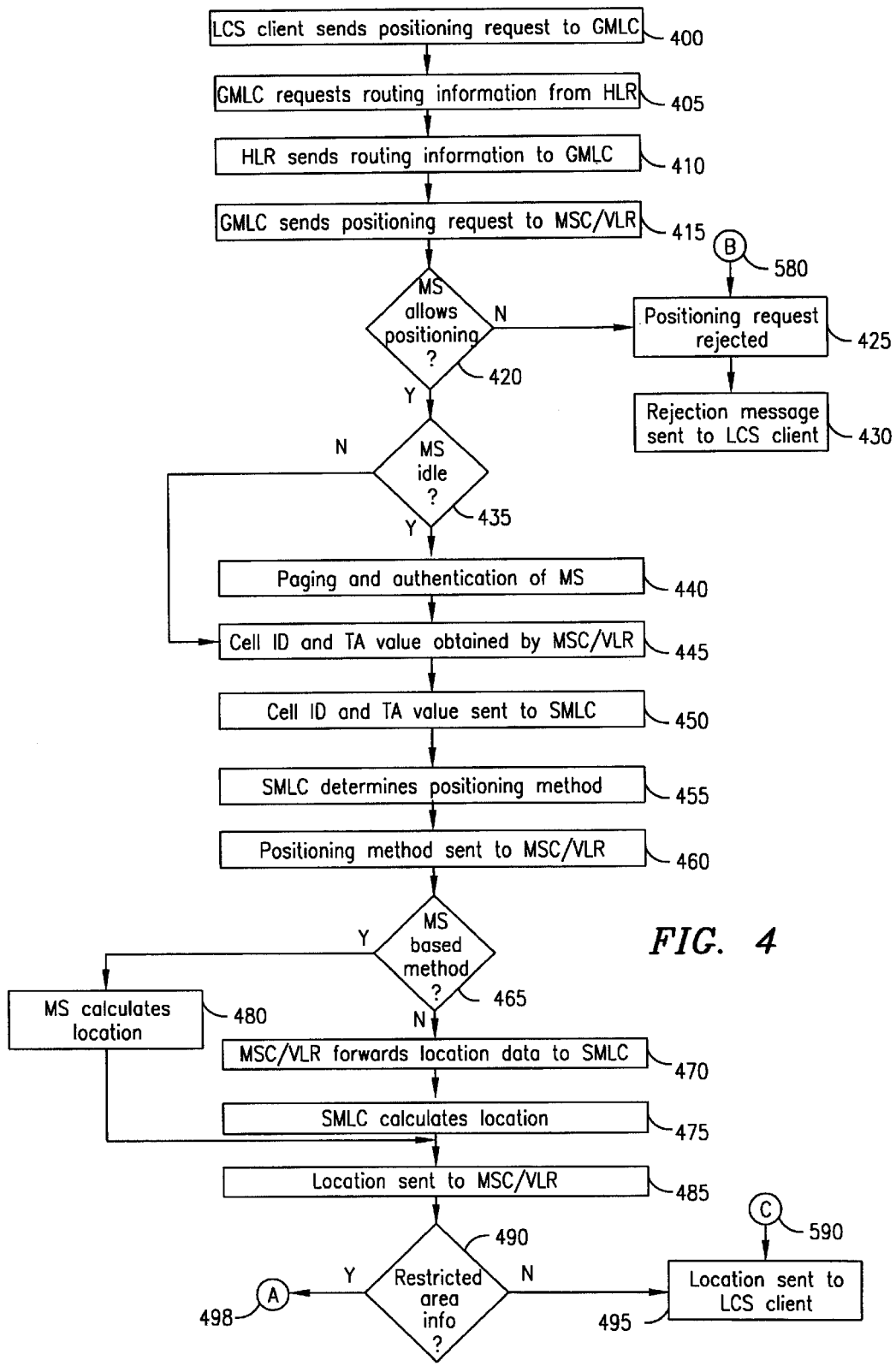
FIG. 4 is a flow chart illustrating the steps involved in positioning a mobile subscriber.

If the indication 148.indicates that the calculated location estimate 298 is within the restricted area 160 (step 570), or the MSC/VLR 14 determines that the calculated location estimate 298 is within the restricted area 160 (step 520), as shown in FIG. 4 of the drawings (step 580), the MSC/VLR 14 rejects the positioning request 285 (step 425) and sends the rejection message 295 to the LCS client 280 (step 430). Otherwise (step 590), as shown in FIG. 4 of the drawings, the MSC/VLR 14 transmits the location estimate 298 to the requesting LCS client 280 (step 495) via the GMLC 290.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A telecommunications system for restricting positioning of a mobile station within a cellular network, comprising:
   a database for storing restricted area information associated with a geographical area unrelated to any network area defined by said cellular network; and
   a mobile switching center in wireless communication with said mobile station for receiving a positioning request for said mobile station, determining a location estimate for said mobile station and accessing said database to determine whether said location estimate is within said geographical area encompassed by said restricted area information, said mobile switching center rejecting said positioning request in response to a determination that said location estimate is within said geographical area encompassed by said restricted area information.

2. The telecommunications system of claim 1, wherein said database is within said mobile switching center.

3. The telecommunications system of claim 1, wherein said database is an Intelligent Network node.

4. The telecommunications system of claim 3, wherein said Intelligent Network node includes a database accessible by a Service Control Point.

5. The telecommunications system of claim 3, wherein said mobile switching center has an Intelligent Network Location Services category stored therein, said Intelligent Network Location Services category triggering a query to said Intelligent Network node upon determination of said location estimate.

6. The telecommunications system of claim 5, wherein said query includes said location estimate.

7. The telecommunications system of claim 6, wherein said Intelligent Network node compares said location estimate with said restricted area information to determine if said location estimate is within said geographical area encompassed by said restricted area information.

8. The telecommunications system of claim 7, wherein said Intelligent Network node transmits a query response to said mobile switching center, said query response including an indication of whether or not said location estimate is within said geographical area encompassed by said restricted area information.

9. The telecommunications system of claim 8, wherein said mobile switching center rejects said positioning request when said indication indicates that said location estimate is within said geographical area encompassed by said restricted area information.

10. The telecommunications system of claim 5, wherein said Intelligent Network Location Services category is associated with said mobile station.

11. The telecommunications system of claim 5, wherein said Intelligent Network Location Services category is associated with said mobile switching center.

12. A telecommunications system for restricting positioning of a mobile station within a cellular network, comprising:

an Intelligent Network node for storing restricted area information associated with a geographical area unrelated to any network area defined by said cellular network, said Intelligent Network node further for receiving a query including a location estimate for said mobile station, determining whether said location estimate is within said geographical area encompassed by said restricted area information and transmitting a query response including an indication of whether or not said location estimate is within said geographical area encompassed by said restricted area information; and a mobile switching center in wireless communication with said mobile station for receiving a positioning request for said mobile station, determining said location estimate for said mobile station, sending said query including said location estimate to said Intelligent Network node and receiving said query response from said Intelligent Network node, said mobile switching center rejecting said positioning request when said indication indicates that said location estimate is within said geographical area encompassed by said restricted area information.

13. The telecommunications system of claim 12, wherein said Intelligent Network node includes a database accessible by a Service Control Point.

14. The telecommunications system of claim 12, wherein said mobile switching center has an Intelligent Network Location Services category stored therein, said Intelligent Network Location Services category triggering said query to said Intelligent Network node upon determination of said location estimate.

15. The telecommunications system of claim 14, wherein said Intelligent Network Location Services category is associated with said mobile station.

16. The telecommunications system of claim 14, wherein said Intelligent Network Location Services category is associated with said mobile switching center.

17. A method for restricting positioning of a mobile station within a cellular network, comprising the steps of:

receiving a positioning request for said mobile station at a mobile switching center in wireless communication with said mobile station;

determining a location estimate for said mobile station;

comparing said location estimate with restricted area information associated with a geographical area unrelated to any network area defined by said cellular network; and in response to a determination that said location estimate is within said geographical area encompassed by said restricted area information, rejecting said positioning request by said mobile switching center.

18. The method of claim 17, further comprising the step of:

in response to said step of determining, sending a query including said location estimate from said mobile switching center to an Intelligent Network node.

19. The method of claim 18, wherein said step of comparing is performed by said Intelligent Network node.

20. The method of claim 19, further comprising the step of:

transmitting a query response from said Intelligent Network node to said mobile switching center, said query response including an indication of whether or not said location estimate is within said geographical area encompassed by said restricted area information.

21. The method of claim 17, wherein said restricted area information is associated with said mobile station.

22. The method of claim 17, wherein said restricted area information is associated with said mobile switching center.

23. A method for a mobile switching center to restrict positioning of a mobile station in wireless communication with said mobile switching center within a cellular network, comprising the steps of:

receiving a positioning request for said mobile station at said mobile switching center;

determining a location estimate for said mobile station;

in response to said step of determining, sending a query including said location estimate to an Intelligent Network node;

receiving a query response from said Intelligent Network node, said query response indicating whether said location estimate is within a geographical area encompassed by restricted area information, said restricted area information being unrelated to any network area defined by said cellular network; and if said query response indicates that said location estimate is within said geographical area encompassed by said restricted area information, rejecting said positioning request by said mobile switching center.

24. The method of claim 23, wherein said step of sending further comprises the step of:

triggering an Intelligent Network Location Services category stored within said mobile switching center to send said query in response to said step of determining.

25. The method of claim 24, wherein said Intelligent Network Location Services category is associated with said mobile station.

26. The method of claim 24, wherein said Intelligent Network Location Services category is associated with said mobile switching center.

27. A method for restricting positioning of a mobile station within a cellular network, comprising the steps of:

receiving a positioning request for said mobile station at said mobile switching center;

determining a location estimate for said mobile station;

in response to said step of determining, sending a query including said location estimate to an Intelligent Network node;

comparing said location estimate with restricted area information stored within said Intelligent Network node, said restricted area information being associated with a geographical area unrelated to any network area defined by said cellular network;

determining whether said location estimate is within said geographical area encompassed by said restricted area information;

transmitting a query response from said Intelligent Network node to said mobile switching center, said query response indicating whether said location estimate is within said geographical area encompassed by restricted area information; and if said query response indicates that said location estimate is within said geographical area encompassed by said restricted area information, rejecting said positioning request by said mobile switching center.

28. The method of claim 27, wherein said step of sending further comprises the step of:

triggering an Intelligent Network Location Services category stored within said mobile switching center to send said query in response to said step of determining said location estimate.

29. The method of claim 28, wherein said Intelligent Network Location Services category is associated with said mobile station.

30. The method of claim 28, wherein said Intelligent Network Location Services category is associated with said mobile switching center.

* * * * *